United States Patent Office 3,303,166
Patented Feb. 7, 1967

3,303,166
POLYTHIOFORMALDEHYDES AND METHOD OF PRODUCING THEM
Pierre Bapseres, Pau, and Jean Signouret, Billiere, Basses-Pyrenees, France, assignors to Societe Nationale des Petroles d'Aquitaine, Paris, France, a corporation of France
No Drawing. Filed May 14, 1963, Ser. No. 280,454
Claims priority, application France, May 15, 1962, 897,600
5 Claims. (Cl. 260—67)

This invention relates to polythioformaldehydes and a method for producing them and, more particularly, to a process for producing novel polythioformaldehydes.

Products known as polythioformols have been known for some time; these substances are, in fact, mixtures of polythioformaldehyde with formaldehyde and water. Such products have been the subject of considerable prior study and have been prepared by the action of hydrogen sulphide on formaldehyde, according to the following reaction:

$$HCHO + H_2S = CH_2S + H_2O \qquad (1)$$

This represents a limited reaction. The water formed reacts with the resulting thioformaldehyde and brings about a partial hydrolysis of the desired compound, so that the substances of the following general formula are obtained:

$$HS—(CH_2S)_n—O—(CH_2O)_m \cdot (H_2O)_b \qquad (2)$$

The prior art materials are generally mixtures of substances corresponding to the Formula 2 and are generally associated with cyclic compounds containing atoms of sulphur and oxygen, particularly dithiane and trithiane. They are obtained by Reaction 1 in low yields and their sulphur content in general does not exceed ⅔ of that which is the theoretical content of thioformaldehyde. By weight, this content is generally in the order of 50% and sometimes less. At the same time trithioformaldehyde having a melting point of 216° C. has been mentioned in the literature, as well as other polythioformaldehydes having melting points in the range from 220° C. to 247° C. These are mixtures which are rich in trithanes, which means that they are cyclic and not straight chain compounds. These deficiencies of the prior art have been obviated in a novel manner by the present invention.

It is, therefore, an outstanding object of the invention to provide a novel process for producing polythioformaldehydes.

Another object of this invention is the provision of novel polythioformaldehydes.

A further object of the present invention is the provision of polythioformaldehydes exhibiting softening points in the range from 70° C. to 240° C. (and especially from 70° C. to 120° C.) which can be easily transformed into products melting at any desired temperature ranging from 120° C. to 240° C.

It is another object of the instant invention to provide a method for preparing at will a polythioformaldehyde having more than three CH$_2$S groups and exhibiting a predetermined softening point in the range from 70° C. to 240° C.

It is a further object of the invention to provide a rubber vulcanization agent consisting of a polythioformaldehyde of unusual characteristics.

A still further object of this invention is the provision of polythioformaldehydes having rather low melting points and capable of being used as reagents for various chemical syntheses.

With the foregoing and other objects in view, as will appear as the description proceeds, the invention resides in the combination and arrangement of parts and in the details hereinafter described and claimed, it being understood that changes in the precise embodiment of the invention herein disclosed may be made within the scope of what is claimed without departing from the spirit of the invention.

The present invention is concerned with well-defined polythioformaldehydes, which contain very little, if any, oxygen and nitrogen. They are suitable for various industrial uses, for which purposes it is difficult to use the presently known compounds. These novel polythioformaldehydes can have a variety of molecular weights and can be produced in a desired state of purity.

These new products in accordance with the invention are polythioformaldehydes of the general formula:

$$HS—(CH_2S)_n—H \qquad (3)$$

in which the number, $n$, of $CH_2S$ groups may be any desired size. The number of groups can be varied readily between 3 and 30 by carrying out the process in accordance with the present invention.

These new compounds (in contrast to those of the prior art) have proportions by weight of sulphur greater than 50%, generally in the range from 55% to 73%, but more particularly, in the range from 62% to 72%. Depending upon the size of $n$, the compounds occur in the solid state in a more or less compact form and they melt at temperatures in the range from 70° C. to 240° C.

Generally speaking, the process of the invention consists in heating formaldehyde with hydrogen sulphide and eliminating from the reaction medium the water formed by the reaction between them.

According to a particularly advantageous embodiment, the elimination of the water is effected in proportion to and at the time of formation of the thioformaldehyde.

This elimination of the water can be effected by any known method, but preferably it is accomplished by its entrainment in the form of an azeotropic mixture with a suitable auxiliary liquid. It is advantageous to add to the reaction medium one or more solvents which are capable of giving an azeotropic mixture with water and by distilling off such a mixture. Practical examples of such solvents are benzene, toluene, xylene, dioxane, and dimethylmethadioxane. In the particular case of the last two solvents, the final azeotropic entrainment is made using an aromatic hydrocarbon which is immiscible with water, but forms an azeotrope with it.

In order to remove the water formed by the reaction as completely as possible (and also the water which is present in the starting mixture when aqueous formaldehyde is used) the amount of the solvent should be at least twice the amount of formaldehyde involved. In general, the amount of the solvent is 5 to 100 (particularly 10 to 40) times that of the starting formaldehyde, depending on the nature of the solvent used.

One embodiment of the invention which gives very good results and permits the formation of products having the precise composition desired to be prepared, consists of using the three successive stages: (1) the saturation of a mixture of formaldehyde and the auxiliary liquid with hydrogen sulphide, (2) the dehydration of the reaction mixture by the distillation of a part of the liquid, while continuing saturation with H$_2$S, and (3) the elimination of all the auxiliary liquid.

This mode of operation requires the use of a quantity of solvent which is sufficient to entrain all the water formed in the form of an azeotropic mixture. In order to avoid using an excessive amount of solvent, it is recommended that the liquid be recycled, in the reaction medium, in proportion to its separation with the entrained water, during distillation of the azeotrope. Preferably, all the operative phases of the process are carried out in the presence of a stream of $H_2S$ introduced into the reaction medium.

Saturation of the reaction medium with the hydrogen sulphide can occur at various temperatures, for instance in the range from 0° to 100° C., but preferably between 50° C. and 100° C.; however, the boiling point of the azeotrope formed by the water and the solvent or solvents should be avoided. This means, for instance, that with benzene as the dehydrating liquid, during the first operative stage, the temperature should not attain 69.3° C. or, with toluene, 84.1° C. The second stage, dehydration of the medium, can take place precisely at the boiling point of the azeotropic mixture. The third stage (elimination of the excess dehydrating liquid) must naturally take place at the temperature at which the liquid boils. This may take place, if necessary, under reduced pressure. This temperature is 80.2° C. for benzene, 110.8° C. for toluene and 101.4° C. for dioxane, under atmospheric pressure.

The respective durations of the three operative stages may vary with the conditions of temperature, concentration, $H_2S$ input, etc. On the average, they are 4 to 10 hours for the first stage, 1 to 4 hours for the second stage and 0.1 to 1 hour for the third stage.

The sulphiding gas may be pure $H_2S$ or it may be any gaseous mixture containing $H_2S$ and other gases which do not react with the formaldehyde, for instance, nitrogen or carbon dioxide.

The formaldehyde used in the preparation according to the invention may be in any of the known forms in which HCHO is available. In particular, use can be made of an approximately 40% commercial formaldehyde solution, which contains water and methyl alcohol. It is also possible to use a polyoxymethylene, such as trioxymethylene, in the form of a powder and to place it in suspension in the solvent which has been chosen as the dehydrating azeotrope. The use of formaldehyde in such a concentrated form has the advantage of considerably shortening the duration of the second operative step.

The mode of preparation described above usually produces polythioformaldehydes of relatively low molecular weight, namely of about 170 to 360, corresponding to values of $n$ in Formula 3 of from 3 to 7. Where products of higher molecular weight (for instance from 360 to 1500 or higher) are to be prepared, the thioformaldehyde prepared is subjected to supplementary heating in order to effect polycondensation.

According to a preferred form of the invention, such polycondensation is effected by heating the polythioformaldehyde in the presence of a catalyst at a temperature in the range from 50° to 100° C. This heating step lasts generally to 12 hours according to the degree of polycondensation desired.

Catalysts which give products in which $n$ is in the range of 14 to 30 include, in accordance with the invention, a solution of a base, particularly a strong base such as aqueous caustic soda or potash, or boron trifluoride in the presence of acetic anhydride.

It is also possible to cause polycondensation during the preparation of the polythioformaldehyde (during the first, second and/or third operative steps) by adding a suitable catalyst to the reaction medium. The presence of a small amount of caustic soda accelerates the absorption of $H_2S$ and also slightly increases the length of the $-(CH_2S)_n-$ chains. If the chain length is sufficient and the product has a softening point above 70° C. (preferably 110° C. or over, when $n$ exceeds 3), the polythioformaldehyde constitutes a high sulphur content material, which is insoluble in usual solvents and is particularly advantageous for the vulcanization of rubber.

In order to illustrate the invention, the following examples are given:

*Example 1.*—10 liters of commercial formaldehyde, containing 40% HCHO, and 10 liters of dioxane were introduced into a reactor provided with a rotary stirrer. The reactor was heated to 80° C. and a gas consisting of 60% $H_2S$ and 40% $CO_2$ was introduced through a diptube, so that the gas bubbled through the liquid mixture. The gas saturation lasted 8 hours, after which dehydration of the liquid was effected by distillation of the water-dioxane-toluene azeotrope, after addition to the medium of 10 liters of toluene. The distillation took place in the range from 80° to 90° C. and lasted 2 hours. During the cooling and recovery of the azeotropic mixture outside the reactor, the dioxane separated from the water was recycled to the reactor through a separate tube provided for the purpose. During this time, the sulphiding gas was also bubbled in. Finally, when no more water was entrained with the dioxane vapor, the latter was eliminated by distilling at 110° C., in the presence of a stream of the sulphiding gas. A white liquid mass was left in the reactor, which solidified on cooling. After pulverization, 8 kg. of tetrathioformaldehyde, $HS-(CH_2S)_4-H$, containing 68% sulphur was recovered. The softening point of the product was between 70° and 80° C.

*Example 2.*—The heptamer, $HS-(CH_2S)_7-H$, was prepared in a manner analogous to Example 1, the auxiliary liquid for the azeotropic dehydration being toluene alone, the amount being 35 liters for 10 liters of commercial formalin. Dehydration took place at 85°–90° C., while the final distillation to eliminate the toluene occurred at 110.8° C. The polythioformaldehyde obtained contained 63% of sulphur and had a softening point from 110° to 120° C.

*Example 3.*—The tetramer of Example 1 was suspended in water at a 20% concentration and heated to 80° C. for 6 hours, in the presence of 40% aqueous NaOH solution added at the rate of 10% by weight. This treatment had the effect of causing polycondensation which produced a polymer containing approximately 14 $-CH_2S-$ chain elements ($n=14$). After separation of the caustic soda solution, the product contained 70% sulphur and softened at 200° to 210° C.

*Example 4.*—An $n=20$ polymer, namely $$HS-(CH_2S)_{20}-H$$

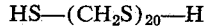

was obtained from the heptamer of Example 2, after a treatment with caustic soda as in Example 3. The white amorphous product obtained contained 65% sulphur and had a softening point from 210° to 220° C.

*Example 5.*—The heptamer prepared according to Example 2 was suspended in toluene and treated at 80° C. for 3 hours with a catalyst consisting of a solution of $BF_3$ in ether in the amount of 10% by weight of the polythioformaldehyde treated. The resultant product contained 65% sulphur and softened at about 240° C. It appeared to contain 25 to 30 $-CH_2S-$ groups.

*Example 6.*—Using the method of Example 5, 10% of acetic anhydride was added to the $BF_3$. The same result as in Example 5 was attained, but more rapidly in about 1½ hours.

*Example 7.*—In the reactor used in Example 1, a suspension of 5 kg. of trioxymethylene in 10 liters of dioxane was introduced and the operations were conducted in the same manner as in Example 1, except that one hour was sufficient for dehydration of the reaction medium. The same results were obtained as in Example 1.

*Example 8.*—The product of Example 2 was obtained from a suspension of trioxymethylene in toluene, in proportions equivalent to those of Example 7.

In the foregoing results, the number of $-CH_2S-$ groups $n$ was determined by elementary analysis and acetylation. The numbers obtained were averages and are not to be understood as limiting the invention.

While it will be apparent that the embodiments of my invention disclosed herein are well calculated adequately to fulfill the objects and advantages primarily stated, it is to be understood that the invention is susceptible to variation, modification, and change within the spirit and scope of the subjoined claims.

The invention having been thus described, what is claimed as new and desired to secure by Letters Patent is:

1. A process for producing polythioformaldehydes by reacting formaldehyde with hydrogen sulfide, which comprises the steps of:

adding formaldehyde with at least one organic liquid capable of forming azeotropic mixture with water, the said liquid being selected from the group consisting of benzene, toluene, xylene, dioxane, and dimethylmethadioxane, the liquid being present in an amount greater than twice that of formaldehyde, saturating the formaldehyde-containing medium with hydrogen sulfide at a temperature in the range from 50° C. to the boiling point of said azeotropic mixture, removing water by distilling said azeotropic mixture, and separating the remaining liquid by distilling it from the solid polythioformaldehyde formed.

2. A process as recited in claim 1, wherein the said solid polythioformaldehyde formed is suspended in alkali hydroxide containing water and heated at a temperature in the range from 50° to 100° C. for a period of time in the range from 1 to 12 hours, the resulting solid product being thereafter separted from the water.

3. A process as recited in claim 1, wherein said solid polythioformaldehyde formed is suspended in at least one of said organic liquids in the dry state, added with a catalytical amount of boron fluoride, and heated at a temperature in the range from 50° to 100° C. for a period of time in the range from 1 to 12 hours, the resulting solid product being thereafter separated from the liquid.

4. A process of preparing a polythioformaldehyde of molecular weight ranging from 170 to 1500, comprising the steps of reacting formaldehyde with hydrogen sulphide at a temperature in the range between 0° and 100° C., removing the water of the resulting reaction medium as it is formed by adding to this reaction medium an organic liquid entering in azeotropic mixture with said water, distilling the azeotropic mixture from said medium, and separating the solid product thus formed from the medium.

5. A process of preparing a polythioformaldehyde of molecular weight ranging from 170 to 1500, comprising the steps of saturating a commercial solution of formaldehyde with a stream of hydrogen sulphide, removing the water of the resulting reaction medium as it is formed by adding to this reaction medium at least one organic liquid entering in azeotropic mixture with said water and selected from the group consisting of benzene, toluene, xylene, dioxane and dimethyldioxane, in amounts greater than twice that of formaldehyde, said saturation being performed at a temperature in the range from 50° C. to the boiling point of said azeotropic mixture, distilling said azeotropic mixture, and finally separating the solid polythioformaldehyde formed from the medium.

References Cited by the Examiner

UNITED STATES PATENTS

| 1,991,765 | 2/1935 | Marks | 260—67 |
| 2,206,641 | 7/1940 | Patrick | 260—67 |

FOREIGN PATENTS

| 123,293 | 1/1947 | Australia. |

OTHER REFERENCES

Cairns et al.: Journ. Amer. Chem. Soc., vol. 74, No. 16, pp. 2982–9 (1952).

WILLIAM H. SHORT, *Primary Examiner.*

JOSEPH L. SCHOFER, L. M. MILLER,
*Assistant Examiners.*